United States Patent
Yoshioka (10) Patent No.: US 7,429,978 B2
(45) Date of Patent: Sep. 30, 2008

(54) PORTABLE ELECTRONIC APPARATUS

(75) Inventor: Takayuki Yoshioka, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 811 days.

(21) Appl. No.: 11/077,213

(22) Filed: Mar. 11, 2005

(65) Prior Publication Data

US 2005/0156898 A1 Jul. 21, 2005

Related U.S. Application Data (63) Continuation of application No. PCT/JP03/02653, filed on Mar. 6, 2003.

(51) Int. Cl.
G06F 3/02 (2006.01)
G06F 3/033 (2006.01)

(52) U.S. Cl. .................. 345/169; 345/157; 345/160; 345/168; 345/184

(58) Field of Classification Search .......... 345/156–184
See application file for complete search history.

(56) References Cited

U.S. PATENT DOCUMENTS

| 5,713,042 | A | * | 1/1998 | Takahashi | 345/160 |
| 5,900,875 | A | | 5/1999 | Haitani et al. | 345/349 |
| 6,198,474 | B1 | | 3/2001 | Roylance | 345/169 |
| 6,992,658 | B2 | * | 1/2006 | Wu et al. | 345/169 |
| 2004/0135772 | A1 | * | 7/2004 | Kao et al. | 345/168 |

FOREIGN PATENT DOCUMENTS

| EP | 0 747 835 A1 | 12/1996 |
| JP | 50-138382 | 11/1975 |
| JP | 55-67431 | 3/1979 |
| JP | 58-133841 | 9/1983 |
| JP | 62-35933 | 2/1987 |
| JP | 62-37336 | 3/1987 |
| JP | 3-61997 | 3/1991 |

(Continued)

OTHER PUBLICATIONS

Williams J A; "Keyboard Cursor Control Layout" IBM Technical Disclosure Bukketubm IBM Corp. New York, US, vol. 26, No. 4, Sep. 1, 1983, pp. 1967-1968, XP002226449 ISSN: 0018-8689 *the whole document*.

(Continued)

Primary Examiner—David L. Lewis
(74) Attorney, Agent, or Firm—Kratz, Quintos & Hanson, LLP (57) ABSTRACT

A portable electronic apparatus includes a display unit, a key operation unit which detects depression operation of each of a first direction key and a second direction key adjacent to the first direction key and outputs a detection signal, and a control unit which controls displaying of a screen of the display unit in accordance with the detection signal. The control unit comprises a cursor movement detection unit which outputs a cursor movement information for moving the cursor on the screen of the display unit in accordance with a detection signal outputted when the first direction key is depressed solely, and a scrolling movement detection unit which outputs a scrolling operation information for scrolling the screen of the display unit in accordance with a detection signal outputted when both the first direction key and the second direction key are depressed simultaneously.

10 Claims, 8 Drawing Sheets

FOREIGN PATENT DOCUMENTS

| | | |
|---|---|---|
| JP | 4-118715 | 4/1992 |
| JP | 7-93124 | 4/1995 |
| JP | 9-134248 | 5/1997 |
| JP | 2000-293290 | 10/2000 |
| JP | 2001-282386 | 10/2001 |
| JP | 2002-149334 | 5/2002 |

OTHER PUBLICATIONS

Supplementary European Search Report of Feb. 24, 2006.
International Search Report dated Apr. 22, 2003 from prior International Application No. PCT/JP03/02653 filed Mar. 6, 2003.
Tomonori Abe: "MS-Excel Operation Guidebook", Oct. 17, 1991; ISBN4-8163-1061-4; pp. 77-79 with partial translation (4 pages).

* cited by examiner

PORTABLE ELECTRONIC APPARATUS

CROSS-REFERENCE TO RELATED APPLICATION

This application is a U.S. continuation application which is filed under 35 USC 111(a) and claims the benefit under 35 USC 120 and 365(c) of International Application No. PCT/JP2003/002653, filed on Mar. 6, 2003, the entire contents of which are hereby incorporated by reference.

BACKGROUND OF THE INVENTION

1. Field of the Invention

The present invention relates to a portable electronic apparatus, such as PDA, which can perform viewing and editing of the data on the screen of the display unit.

2. Description of the Related Art

The conventional compact type PDA (portable digital assistant) is aimed at the miniaturization by omitting the keyboard, and it is a portable electronic apparatus that enables the user to perform operation by the single hand. There are various products of the portable electronic apparatus which have been developed as the personal information-management tool and have been put in practical use.

For example, there is a known compact type PDA which can perform viewing and editing of the data by being interacted with the personal computer, and can perform transmission and reception of an e-mail or facsimile and accessing of the Internet by using the modem or the cellular phone.

However, since the keyboard is omitted from the compact type PDA, it is difficult to use the PDA functions only with the PDA main part, and the interaction with the personal computer is indispensable. For this reason, the compact type PDA is unsuitable for the work to input additional data newly, and the usage of the compact type PDA is limited to the viewing function of viewing the data already created on the personal computer, or the editing function of changing a part of the data already created on the personal computer.

One example of the conventional compact type PDA that is widely used is the PDA equipped with the stylus pen as the input device, instead of the mouse or the keyboard. In the PDA of this type, the stylus pen is brought into contact with the touch panel or tablet, and the absolute coordinates of the position where the point contact is made are inputted.

However, it is difficult for the user to operate the stylus pen by the single hand, and there is the problem that the user is unable to perform the viewing and editing of data easily when the user wishes to access a large amount of data on the screen.

In addition, as the conventional technology relevant to this invention, Japanese Laid-Open Patent Application No. 2002-149334 discloses a pointing device which is used for the personal computer or the like. This pointing device is small in size and has a circular shape, and it is provided with the upper-surface circular lid and the pressure sensor mechanism for the purpose of improvement in operability.

Moreover, Japanese Laid-Open Patent Application No. 09-134248 discloses a pointing input device which is used for the remote controller of the television receiving set. This pointing input device is provided with the disc-like operation button and the slide switch. The slide switch is used to detect a slide movement operation on the operation button. A pressure sensor is arranged on each of the four division regions of the operation button respectively and used to detect a depression operation on each division region of the operation button.

SUMMARY OF THE INVENTION

An object of the present invention is to provide an improved portable electronic apparatus in which the above-described problems are eliminated.

Another object of the present invention is to provide an electronic apparatus in which the operability is improved so that the user can operate the electronic apparatus by the single hand easily even when a large amount of data on the screen is viewed and edited.

In order to achieve the above-mentioned objects, the present invention provides an electronic apparatus which includes a display unit, a key operation unit which detects depression operation of each of a first direction key and a second direction key adjacent to the first direction key and outputs a detection signal, and a control unit which controls displaying of a screen of the display unit in accordance with a detection signal from the key operation unit, the control unit comprising: a cursor movement detection unit outputting a cursor movement information for moving the cursor displayed on the screen of the display unit relative to the screen in accordance with a detection signal outputted when the first direction key is depressed solely; and a scrolling movement detection unit outputting a scrolling operation information for carrying out scrolling movement of the screen of the display unit in accordance with a detection signal outputted when both the first direction key and the second direction key are depressed simultaneously.

According to the electronic apparatus of the present invention, each of the first direction key and the second direction key adjacent to the first direction key in the key operation unit can be easily depressed by the user by the single hand (the thumb), and one of the cursor movement information for moving the cursor on the screen of the display and the scrolling operation information for carrying out scrolling movement of the screen of the display is selectively outputted to the control unit upon depression. The control unit controls the displaying of the screen of the display in accordance with the received screen-displaying information.

Therefore, according to the electronic apparatus of the present invention, even when viewing and editing a large amount of data on the screen, the user can operate the electronic apparatus easily by the single hand (the thumb), and the operability can be raised.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

A description will now be given of the preferred embodiments of the invention with reference to the accompanying drawings.

Figure 1:
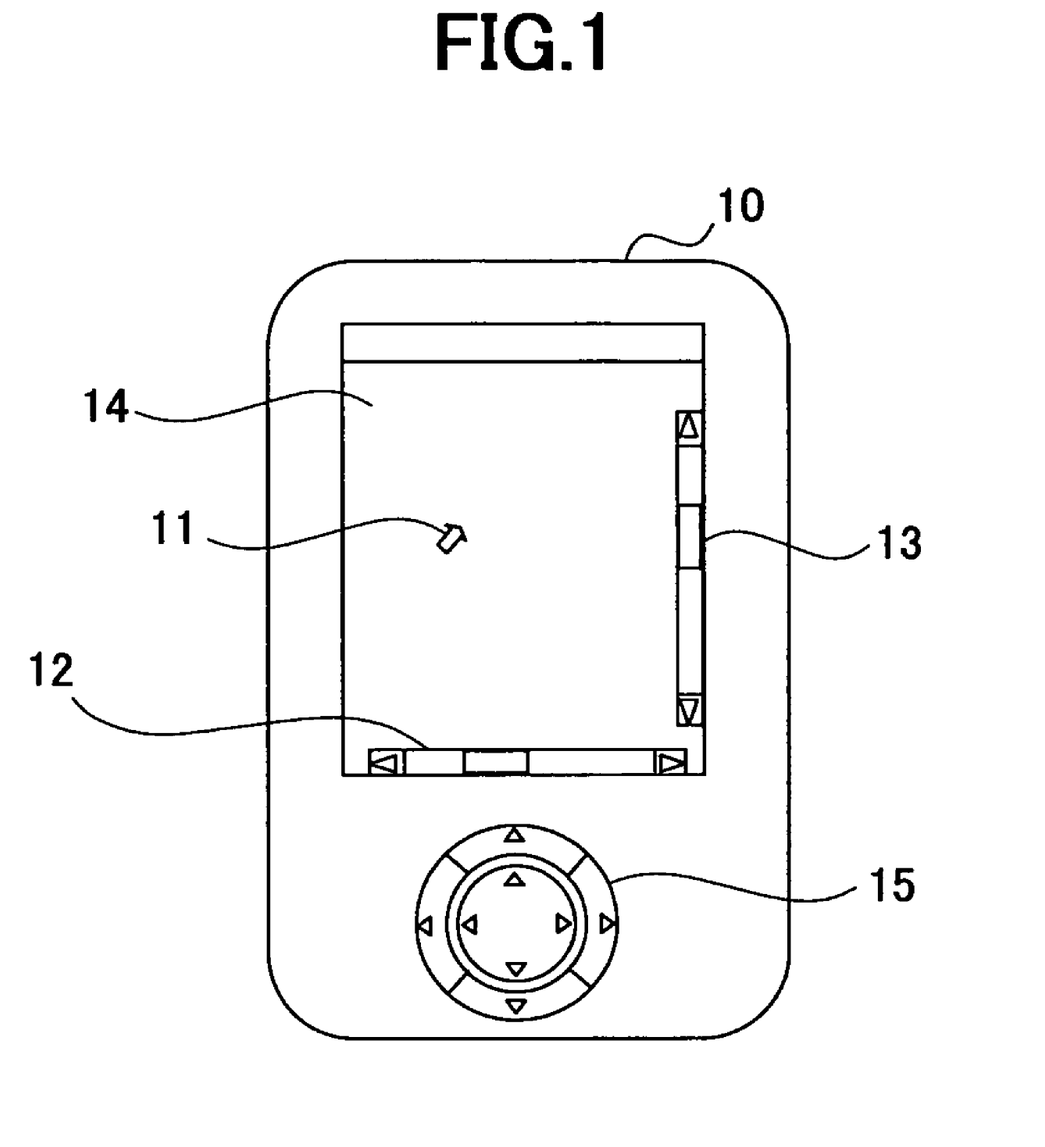
FIG. 1 is a diagram showing the portable electronic apparatus in one preferred embodiment of the invention.

FIG. 1 shows the portable electronic apparatus in the preferred embodiment of the invention. The PDA in which the portable electronic apparatus of the invention is embodied is shown in FIG. 1 as a typical example.

As shown in FIG. 1, the PDA 10 comprises the display unit 14 in which the cursor 11 is displayed on the screen, the key operation unit 15, and the control unit (not shown). The control unit of the PDA 10 will be explained later using FIG. 11.

The display unit 14 comprises the right-and-left scroll bar 12 and the up-and-down scroll bar 13 which are displayed on the bottom side and the left-hand side edges of the screen, and the scroll bar 12 and the scroll bar 13 are interlocked with the right-and-left direction and the up-and-down direction scrolling movements of the data on the screen.

Similar to the conventional PDA, the PDA 10 of FIG. 1 is constituted so that it can perform viewing and editing of the data by being interacted with the personal computer, can perform transmission and reception of an e-mail or facsimile by using the modem or the cellular phone, and can perform accessing the Internet on the screen of the display unit 14.

At the same time, by installing a certain application software in advance, the PDA 10 can perform execution of the software and can display the result of the execution on the screen of the display unit 14.

As previously described, the conventional PDA is constituted such that the stylus pen is brought into contact with the touch panel or tablet at the point of contact, and usually the user has to have the stylus pen by one hand and have the PDA main part by the other hand. Therefore, it is difficult for the user to operate the conventional PDA by the single hand easily.

Figure 4:
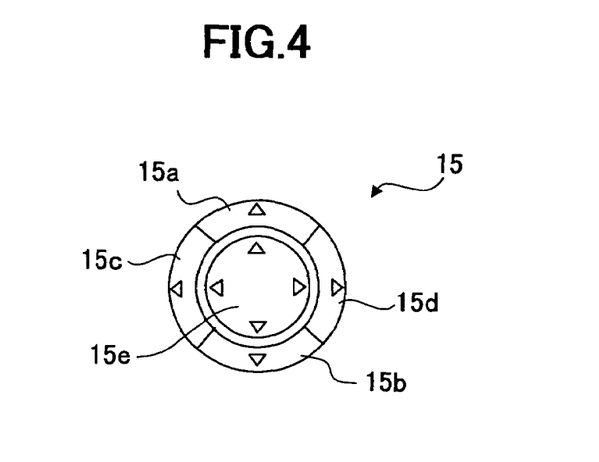
FIG. 4 is a diagram showing the composition of the key operation unit in the portable electronic apparatus of FIG. 1.

To obviate the problem, the portable electronic apparatus of FIG. 1 is constituted without using the stylus pen like the conventional PDA, so that the key operation unit 15 is constituted as shown in FIG. 4, and the cursor 11 which is the same as that in the display device of the personal computer is arranged on the display unit 14.

FIG. 4 shows the composition of the key operation unit 15 of the portable electronic apparatus of FIG. 1.

As shown in FIG. 4, the key operation unit 15 is arranged in the disc-like formation, and comprises the inside direction key 15e which is provided in the central inside position, and the four outside direction keys 15a, 15b, 15c and 15d which are provided to adjoin the outer periphery of the inside direction key 15e.

In the PDA 10 of FIG. 1, the display unit 14 displays the data on the screen based on the data stored in the memory region of the control unit. The plurality of pressure sensors each of which detects depression operation of one of the direction keys 15a to 15e by the user are arranged in the key operation unit 15, and each pressure sensor outputs the detection signal when the depression operation of the corresponding direction key is detected.

The control unit controls the displaying of the screen of the display unit 14 in accordance with the detection signal outputted from the key operation unit 15.

The PDA 10 of FIG. 1 is constituted as described above, and the following functions which will be explained below are assigned to each direction key of the key operation unit 15 of FIG. 4, so that the user can operate the PDA 10 by the single hand easily even when viewing and editing a large amount of data on the screen.

The first function is to output, when the inside direction key 15e is depressed solely, the cursor movement information for moving the cursor 11 on the screen of the display unit 14, to the CPU of the control unit, and this function is assigned to the inside direction key 15e.

Moreover, the second function is to output, when the inside direction key 15e is clicked solely, the control information for returning instantaneously the current screen of the display unit 14 to the previous screen containing the displayed position preceding the cursor 11, to the CPU of the control unit, and this function is also assigned to the inside direction key 15e.

Furthermore, the third function is to output, when the inside direction key 15e is depressed simultaneously with one of the four outside direction keys 15a, 15b, 15c and 15d, the scrolling operation information for carrying out scrolling movement of the screen of the display unit 14 in one of the four directions: up, down, left and right (which direction is determined by the outside direction key pushed simultaneously), to the CPU of the control unit, and this function is also assigned to the inside direction key 15e.

In the PDA 10 of this embodiment, the following functions which become active when one of the outside direction keys 15a, 15b, 15c and 15d is depressed solely and will be explained below are assigned to respective ones of the outside direction keys 15a, 15b, 15c and 15d in the key operation unit 15.

The first function is to output, when the outside direction key 15a is depressed solely, the first scrolling operation information (1) for carrying out scrolling-down movement of the screen of the display unit 14 with the displayed position of the cursor 11 being fixed (see FIG. 2), to the CPU of the control unit, and this function is assigned to the outside direction key 15a.

The second function is to output, when the outside direction key 15b is depressed solely, the second scrolling operation information (2) for carrying out scrolling-down movement of the screen of the display unit 14 containing the cursor 11 (see FIG. 3), to the CPU of the control unit, and this function is assigned to the outside direction key 15b.

The third function is to output, when the outside direction key 15d is depressed solely, the application operation information for performing setting operation of the application software (which is already installed) to the control unit on the screen of the display unit 14, to the CPU of the control unit, and this function is assigned to the outside direction key 15d. For example, this application software is a program which enables the control unit to have the additional function to enlarge the size of the text contained in the data displayed on the screen of the display unit 14 and helps the user easily view the contents of the data.

The fourth function is to output, when the outside direction key 15c is depressed solely, the application operation information for performing setting operation of another application software (which is already installed) to the control unit on the screen of the display unit 14, to the CPU of the control unit, and this function is assigned to the outside direction key 15c.

Figure 2:
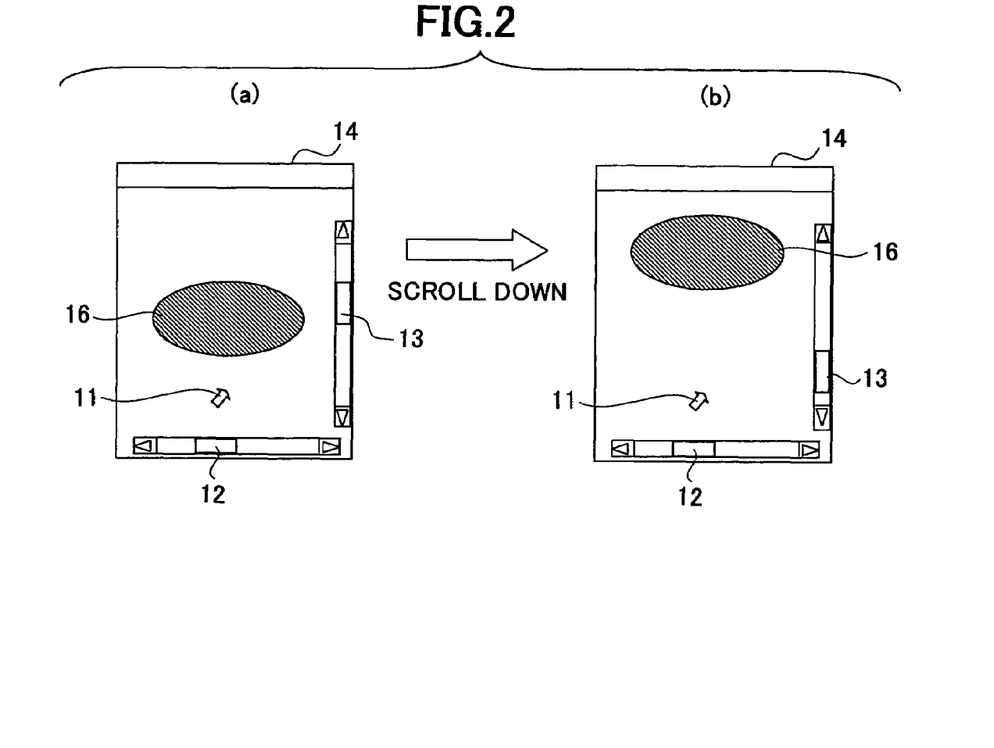
FIG. 2 is a diagram for explaining the first scrolling operation which causes the scrolling movement of the screen with the cursor being fixed in the display unit of the portable electronic apparatus of FIG. 1.

FIG. 2 is a diagram for explaining the first scrolling operation which causes the scrolling movement of the screen in the display unit 14 of the portable electronic apparatus of FIG. 1 with the displayed position of the cursor being fixed.

As indicated by (a) in FIG. 2, the cursor 11 and the indication data 16 are displayed on the screen of the display unit 14. In this state, if the user depresses the outside direction key 15a of the key operation unit 15 solely, the first scrolling operation information (1) is outputted to the CPU of the control unit.

The CPU of the control unit controls the displaying of the screen of the display unit 14 in accordance with the received first scrolling operation information (1), and this allows the scrolling-down movement of the screen of the display unit 14 to be carried out with the displayed position of the cursor 11 being fixed, as indicated by (b) in FIG. 2.

The scrolling operation of FIG. 2 is useful when a large amount of data is displayed on the screen of the display unit 14 of the PDA 10 and the user wishes to perform scrolling movement while following the text with the cursor 11.

Figure 3:
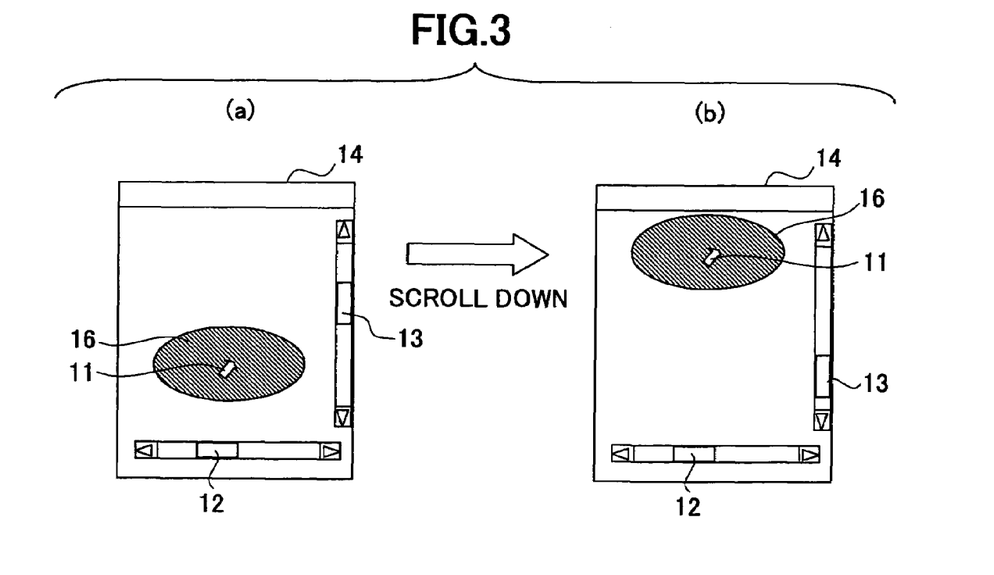
FIG. 3 is a diagram for explaining the second scrolling operation which causes the scrolling movement of the screen together with the cursor in the display unit of the portable electronic apparatus of FIG. 1.

FIG. 3 is a diagram for explaining the second scrolling operation which causes the scrolling movement of the screen together with the cursor in the display unit of the portable electronic apparatus of FIG. 1.

As indicated by (a) in FIG. 3, the indication data 16 including the cursor 11 is displayed on the screen of the display unit 14. In this state, if the user depresses the outside direction key 15b of the key operation unit 15 solely, the second scrolling operation information (2) is outputted to the CPU of the control unit.

The CPU of the control unit controls the displaying of the screen of the display unit 14 in accordance with the received second scrolling operation information (2), and this allows the scrolling-down movement of the indication data on the screen of the display unit 14 including the cursor 11 to be carried out, as indicated by (b) in FIG. 3.

The scrolling operation of FIG. 3 is suitable for the user viewing the indication data when a large amount of data (for example, newspaper data or map data) is displayed on the screen of the display unit 14 of the PDA 10.

Moreover, the portable electronic apparatus of FIG. 1 may be constituted so that the case where the user depresses each direction key of the key operation unit 15 in a normal manner, the case where the user depresses each direction key continuously for a period exceeding a predetermined time, the case where the user depresses the inside direction key and the outside direction key simultaneously, etc., are explicitly detected as being different depression operations of the direction keys.

Since the key operation unit 15 of FIG. 4 is arranged so that the direction keys are located collectively in the center thereof, this allows the user to easily perform the depression operation of one or more direction keys by the single hand (the thumb).

Moreover, while the user depresses the inside direction key 15e with the thumb to perform the movement operation of the cursor 11, the user can easily shift the thumb a little in order to depress the inside direction key and the outside direction key simultaneously. By performing this depression operation, the user can perform the scrolling movement of the screen while moving the cursor 11 on the screen of the display unit 14. This operation becomes the effective means for the user who operates the PDA 10 by the single hand and accesses the Internet.

Figure 11:
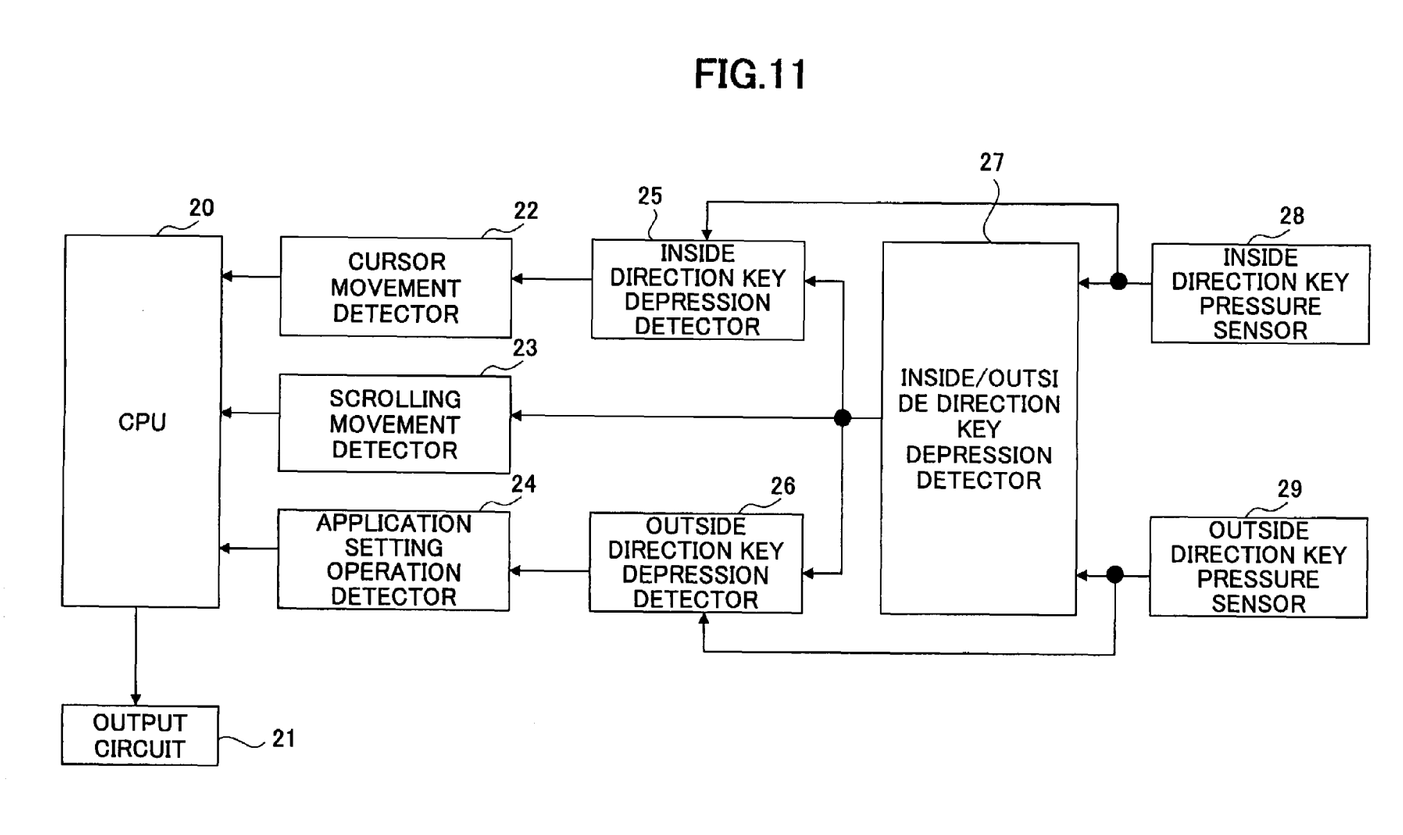
FIG. 11 is a block diagram showing the composition of the control unit in the portable electronic apparatus of the invention.

FIG. 11 shows the composition of the control unit in the portable electronic apparatus of the invention.

The control unit of FIG. 11 is an example of the composition of the principal part of the control unit in the PDA 10 of FIG. 1. As shown in FIG. 11, this control unit comprises the CPU 20, the output circuit 21, the cursor movement detector 22, the scrolling movement detector 23, the application setting operation detector 24, the inside direction key depression detector 25, the outside direction key depression detector 26, and the inside/outside direction key depression detector 27.

The inside direction key pressure sensor 28 and the outside direction key pressure sensor 29 are provided in the key operation unit 15 of the PDA 10 as the pressure sensors for the inside direction key 15e and the outside direction key 15d.

It is necessary that the pressure sensor is provided respectively for each of the four outside direction keys 15a, 15b, 15c and 15d of the key operation unit 15. However, for the purpose of convenience of illustration, only the outside direction key pressure sensor 29 for the outside direction key 15d is shown in FIG. 11.

It is supposed that in the key operation unit 15 of the PDA 10 of this embodiment the pressure sensors are respectively provided for the other outside direction keys 15a, 15b and 15c as well.

When the inside direction key 15e is depressed, the inside direction key pressure sensor 28 of the key operation unit 15 detects the depression operation and outputs a detection signal to each of the inside direction key depression detector 25 and the inside/outside direction key depression detector 27.

Similarly, when the outside direction key 15d is depressed, the outside direction key pressure sensor 29 of the key operation unit 15 detects the depression operation and outputs a detection signal to each of the outside direction key depression detector 26 and the inside/outside direction key depression detector 27.

When the detection signal from the pressure sensor 28 and the detection signal from the pressure sensor 29 are simultaneously received, the inside/outside direction key depression detector 27 output a simultaneous depression detection signal, which indicates that the depression operation of the inside direction key 15e and the outside direction key 15d is carried out simultaneously, to each of the inside direction key depression detector 25, the outside direction key depression detector 26, and the scrolling movement detector 23, respectively.

When only the detection signal from the pressure sensor 28 is received without receiving the simultaneous depression detection signal from the depression detector 27, the inside direction key depression detector 25 outputs an inside direction key independent depression detection signal, which indicates that the inside direction key 15e is depressed solely, to the cursor movement detector 22.

When only the detection signal from the pressure sensor 29 is received without receiving the simultaneous depression detection signal from the depression detector 27, the outside direction key depression detector 26 outputs an outside direction key independent depression detection signal, which indicates that the outside direction key 15d is depressed solely, to the application setting operation detector 24.

The cursor movement detector 22 outputs the cursor movement information for moving the cursor 11 on the screen of the display unit 14, to the CPU 20 in accordance with the inside direction key independent depression detection signal outputted from the inside direction key depression detector 25. The CPU 20 outputs the cursor movement information outputted from the cursor movement detector 22, to the display unit 14 through the output circuit 21. Therefore, the cursor 11 is moved on the screen of the display unit 14 in the direction which is specified by the user.

The scrolling movement detector 23 outputs the scrolling movement information for carrying out scrolling movement of the screen of the display unit 14, to the CPU 20 in accordance with the simultaneous depression detection signal outputted from the simultaneous depression detector 27. The CPU 20 outputs the scrolling movement information outputted from the scrolling movement detector 23, to the display unit 14 through the output circuit 21. Therefore, the screen of the display unit 14 is subjected to scrolling movement in the direction which is specified by the user (which direction is determined by the outside direction key which is depressed simultaneously with the inside direction key 15*e*).

The application setting operation detector 24 outputs the application setting operation information for performing setting operation of the application software to the CPU 20 on the screen of the display unit 14 in accordance with the outside direction key independent depression detection signal outputted from the outside direction key depression detector 26. The CPU 20 outputs the application setting operation information outputted from the application setting operation detector 24, to the display unit 14 through the output circuit 21. Therefore, the setting operation (starting or finishing) of the application software is performed on the screen of the display unit 14.

For example, this application software is a program which enables the control unit to have the additional function to enlarge the size of the text contained in the data displayed on the screen of the display unit 14 and helps the user easily view the contents of the data.

Figure 6:
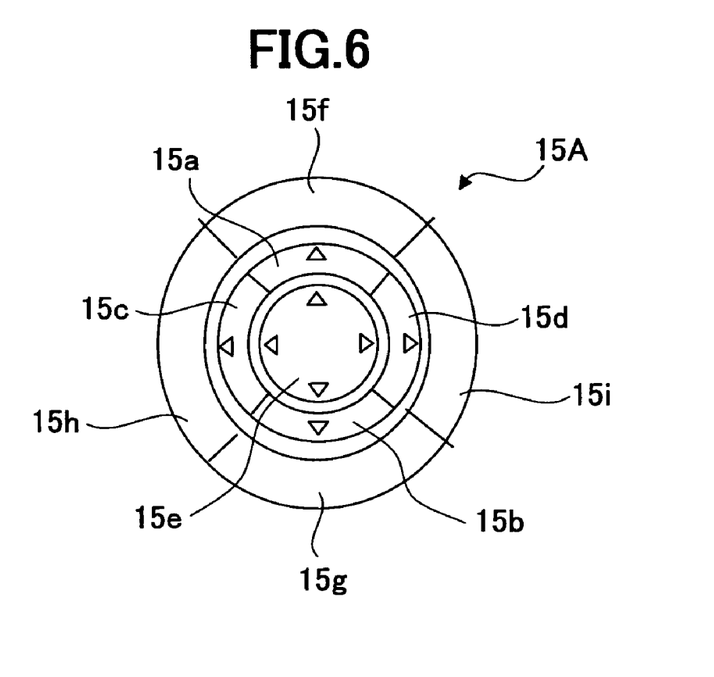
FIG. 6 is a diagram showing a modification of the key operation unit in the portable electronic apparatus of FIG. 1.

FIG. 6 shows a modification of the key operation unit in the portable electronic apparatus of FIG. 1.

The key operation unit 15A shown in FIG. 6 is an example in which the plurality of direction keys are arranged in the three steps. The key operation unit 15A is constituted so that the outside direction keys 15*f*, 15*g*, 15*h*, and 15*i* are further provided to adjoin the outer periphery of the outside direction keys 15*a*, 15*b*, 15*c*, and 15*d* in the composition of FIG. 4, respectively.

Similarly, the key operation unit of the portable electronic apparatus of FIG. 1 may be constituted so that the plurality of direction keys are arranged in the four or more steps.

Figure 7:
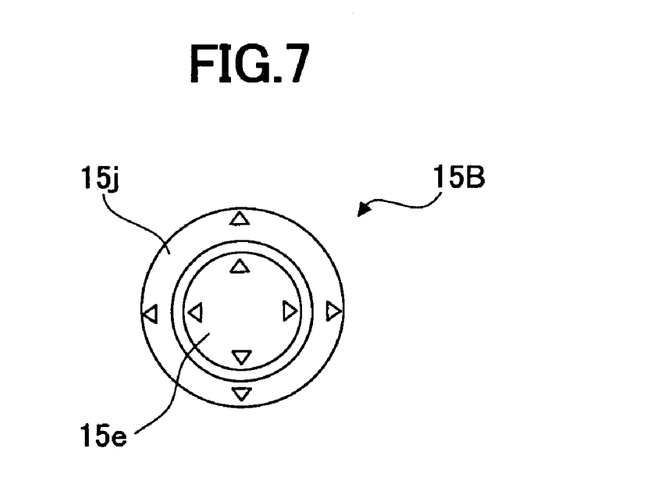
FIG. 7 is a diagram showing another modification of the key operation unit in the portable electronic apparatus of FIG. 1.

FIG. 7 shows another modification of the key operation unit of the portable electronic apparatus of FIG. 1.

The key operation unit 15B shown in FIG. 7 is an example in which the plurality of direction keys are arranged in the two steps and the outside direction key 15*j* wherein the four outside direction keys are formed into the integral part is provided instead of the four outside direction keys 15*a*, 15*b*, 15*c* and 15*d* in the composition of FIG. 4.

According to the composition of the key operation unit 15B of FIG. 7, the user is allowed to easily perform not only the depression operation causing the scrolling movement in any of the four directions of up, down, left and right, but also the depression operation causing the scrolling movement in any slanted direction when the inside direction key and the outside direction key are depressed simultaneously.

Figure 8:
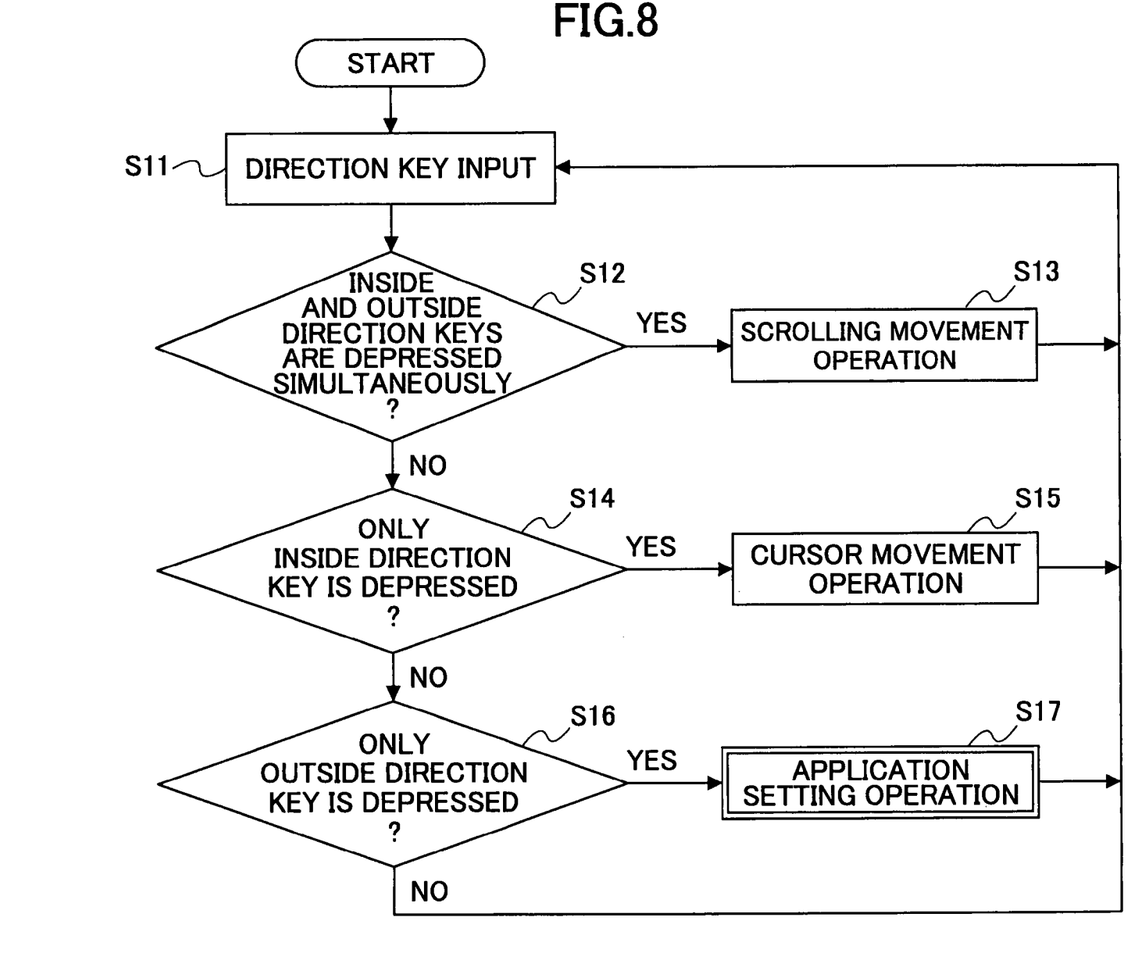
FIG. 8 is a flowchart for explaining the control procedure when performing the basic operation of the portable electronic apparatus of the invention.

FIG. 8 is a flowchart for explaining the control procedure when performing the basic operation of the portable electronic apparatus of the invention.

The control procedure of FIG. 8 is performed by the control unit (the CPU 20 of FIG. 11) of the portable electronic apparatus of the invention in accordance with the program stored in the memory (not shown) of the control unit, in order to control the displaying of the screen of the display unit 14.

In the control procedure of FIG. 8, the CPU 20 in step S11 monitors the occurrence of the user's depression operation on any of the direction keys of the key operation unit 15. When the user performs the depression operation on any of the direction keys of the key operation unit 15, the control is transferred to the following step S12.

In step S12, the CPU 20 determines whether the inside direction key 15*e* is depressed simultaneously with one of the outside direction keys 15*a*-15*d*.

If the determination result of step S12 is YES, in step S13, the CPU 20 outputs the scrolling movement information outputted from the scrolling movement detector 23, to the display unit 14 through the output circuit 21. When the step S13 is completed, the control is returned to the step S11.

If the determination result of step S12 is NO, the control is transferred to the following step S14.

In step S14, the CPU 20 determines whether the inside direction key of inside 15*e* is depressed solely.

If the determination result of step S14 is YES, in step S15, the CPU 20 outputs the cursor movement information outputted from the cursor movement detector 22, to the display unit 14 through the output circuit 21. When the step S15 is completed, the control is returned to the step S11.

If the determination result of step S14 is NO, the control is transferred to the following step S16. In step S16, the CPU 20 determines whether the outside direction key 15*d* is depressed solely.

Figure 9:
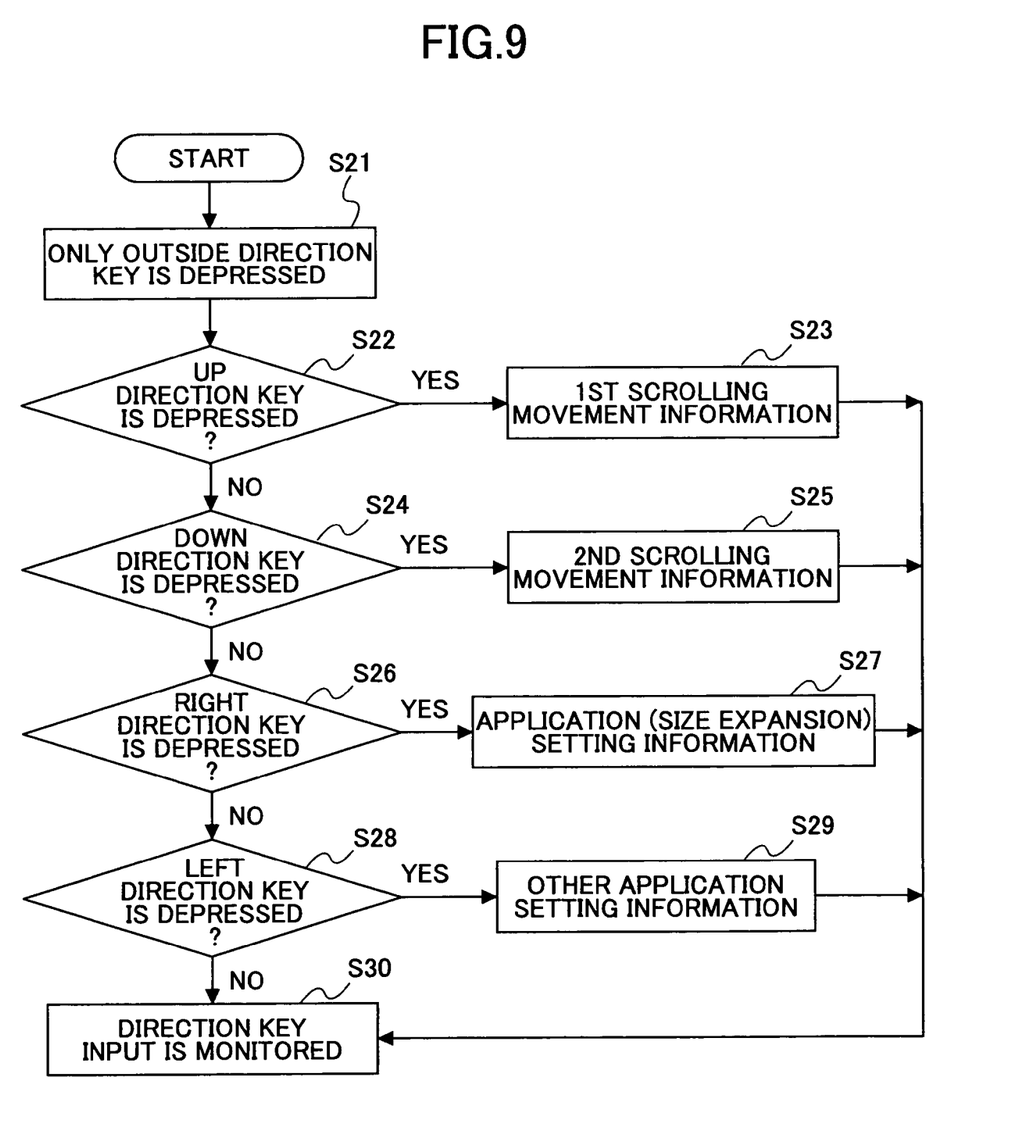
FIG. 9 is a flowchart for explaining the control procedure when performing the setting operation of the application software.

If the determination result of step S16 is YES, in step S17, the CPU 20 outputs the application setting information outputted from the application setting operation detector 24, to the display unit 14 through the output circuit 21 (refer to FIG. 9). When the step S17 is completed, or when the determination result of step S16 is NO, the control is returned to the step S11.

FIG. 9 is a flowchart for explaining the control procedure when performing the setting operation of the application software.

The control procedure of FIG. 9 is performed by the control unit (the CPU 20 of FIG. 11) of the portable electronic apparatus of the invention in accordance with the program stored in the memory (not shown) of the control unit, in order to control the displaying of the screen of the display unit 14.

First, when the CPU 20 determines in step S21 that one of the outside direction keys of the key operation unit 15 is depressed solely (for example, the case where the determination result of step S16 in FIG. 8 is YES is included), the control procedure of FIG. 9 is started.

In step S22, the CPU 20 determines whether the outside direction key 15*a* is depressed solely.

If the determination result of step S22 is YES, in step S23, the CPU 20 outputs the first scrolling movement information (1) (refer to FIG. 2) to the display unit 14 through the output circuit 21. When the step S23 is completed, the control is transferred to the following step S30.

If the determination result of step S22 is NO, in the following step S24, the CPU 20 determines whether the outside direction key 15*b* is depressed solely.

If the determination result of step S24 is YES, in step S25, the CPU 20 outputs the second scrolling movement information (2) (refer to FIG. 3) to the display unit 14 through the output circuit 21. When the step S25 is completed, the control is transferred to step S30.

If the determination result of step S24 is NO, in the following step S26, the CPU 20 determines whether the outside direction key 15d is depressed solely.

If the determination result of step S26 is YES, in step S27, the CPU 20 outputs the application setting information outputted from the application setting operation detector 24, to the display unit 14 through the output circuit 21.

When the application setting information outputted at this time is the control information for starting the application software, the size of the text in the data displayed on the screen of the display unit 14 is enlarged by the additional function.

On the other hand, if the independent depression operation of the outside direction key 15d is performed by the user again, the application setting information is converted into the control information for finishing the application software, and the control information is outputted. When the step S27 is completed, the control is transferred to step S30.

If the determination result of step S26 is NO, in the following step S28, the CPU 20 determines whether the outside direction key 15c is depressed solely.

If the determination result of step S28 is YES, in step S29, the CPU 20 outputs the application setting information for performing the setting operation of other application software, to the display unit 14 through the output circuit 21. When the step S29 is completed, the control is transferred to step S30.

In step S30, the CPU 20 monitors the occurrence of the depression operation on one of the direction keys of the key operation unit 15.

As described above, when the user performs depression operation on one of the direction keys of the key operation unit 15, the control procedure shown in FIG. 8 or the other control procedure is started.

Figure 5:
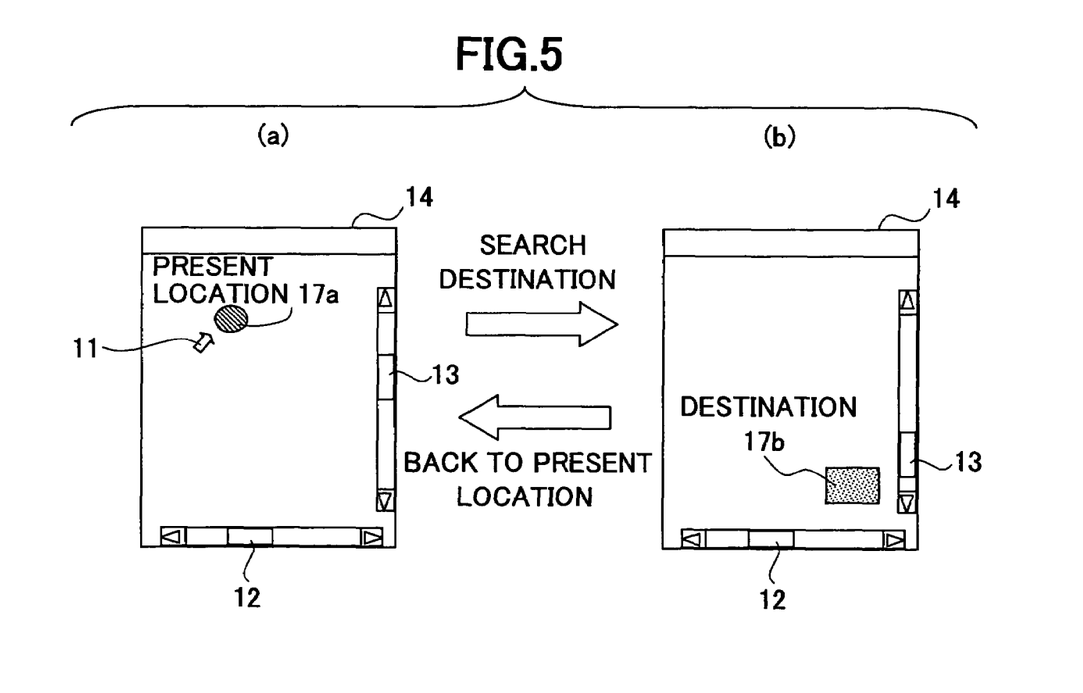
FIG. 5 is a diagram for explaining the application of the second scrolling operation.

Next, FIG. 5 is a diagram for explaining the application of the second scrolling operation.

This example shows the application of the second scrolling operation at the time of starting map viewing software.

First, execution of the map viewing software is started. Next, the second scrolling operation information (2) is set up. And the inside direction key 15e is depressed solely, and the cursor 11 is moved to the position where the image 17a which indicates the present location in the map data is pointed to.

At this time, as indicated by (a) in FIG. 5, the image 17a which indicates the present location in the map data, and the cursor 11 are displayed on the screen of the display unit 14.

If the outside direction key 15b is depressed solely in this state, the second scrolling operation information is outputted to the CPU 20 of the control unit, so that the scrolling-down movement of the screen of the display unit 14 together with the cursor 11 is carried out.

By repeating the above operation, the image 17b which indicates the destination in the map data will be searched on the screen of the display unit 14 of the PDA 10 as indicated by (b) in FIG. 5.

And when the user desires to return to the image 17a which indicates the present location in the map data, what is needed for the user is just to click the inside direction key 15e of the key operation unit 15. Then, the screen of the display unit 14 is instantaneously returned to the original state in which the image 17a and the cursor 11 are displayed, as indicated by (a) in FIG. 5.

The example of FIG. 5 is useful when the user intends to view a large amount of data (newspaper data, map data, etc.) having a large display size on the screen of the display unit 14.

Figure 10:
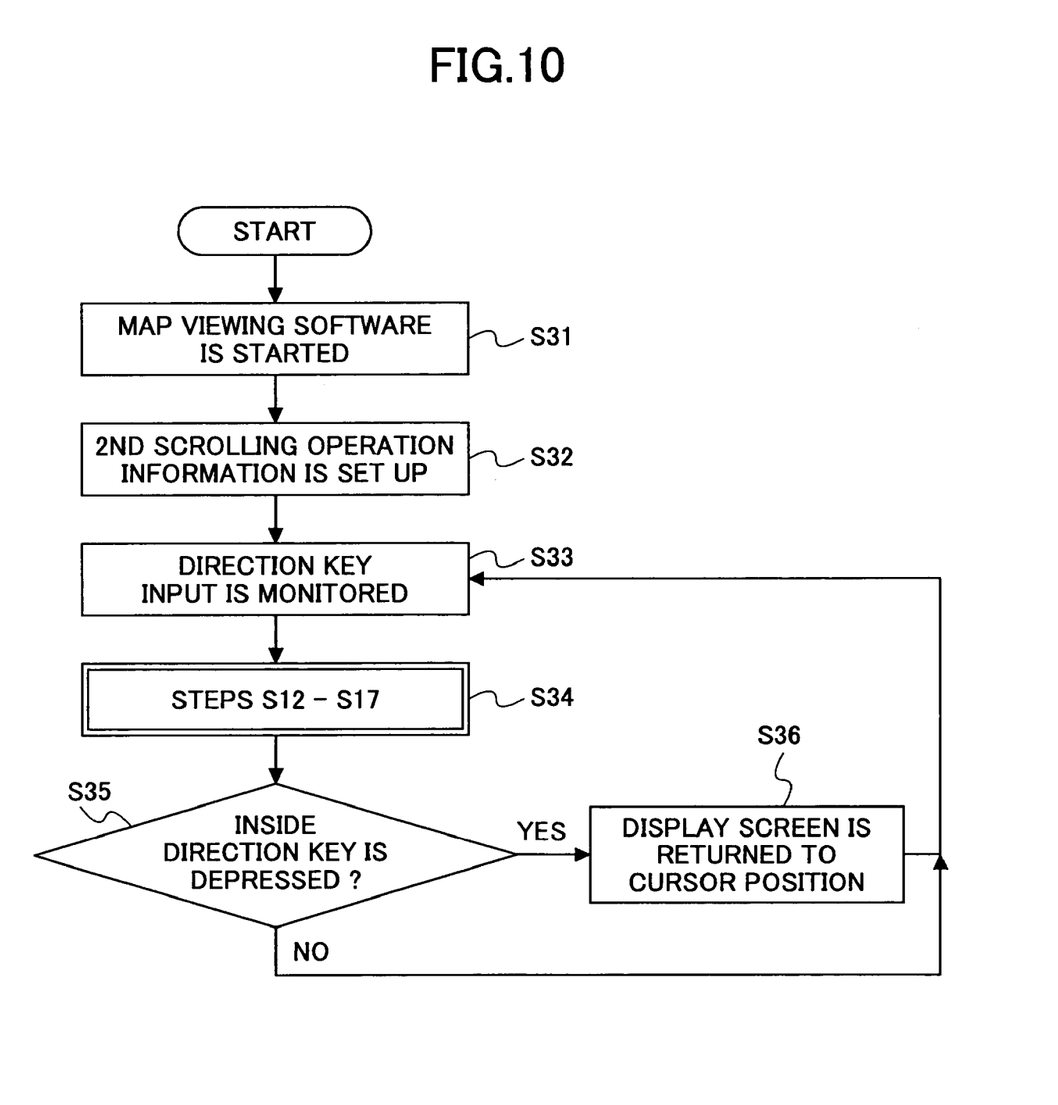
FIG. 10 is a flowchart for explaining the control procedure when starting the map viewing software and performing the viewing operation of the map data.

FIG. 10 is a flowchart for explaining the control procedure when starting the map viewing software and performing the viewing operation of the map data shown in FIG. 5.

The control procedure of FIG. 10 is performed by the control unit (the CPU 20 of FIG. 11) of the portable electronic apparatus of the invention in accordance with the program stored in the memory (not shown) of the control unit, in order to control the displaying of the screen of the display unit 14.

In the control procedure of FIG. 10, the CPU 20 in step S31 starts execution of the map viewing software. For example, at this step S31, the user depresses the outside direction key 15b of the key operation unit 15 solely, and the CPU 20 starts the execution of the map viewing software accordingly.

In step S32, the CPU 20 sets up the second scrolling operation information (2).

In step S33, the CPU 20 monitors the occurrence of depression operation on any of the direction keys of the key operation unit 15.

As mentioned above, when the user performs depression operation on any of the direction keys of the key operation unit 15, the control is transferred to the following step S34.

In step S34, the CPU 20 performs the procedure which is the same as the steps S12-S17 in the control procedure of FIG. 8. The user performs the viewing operation of the map data by using the cursor movement operation, the scrolling movement operation, etc.

In step S35, the CPU 20 determines whether the inside direction key 15e is clicked.

When the determination result of step S35 is YES, in step S36, the CPU 20 controls the displaying of the screen of the display unit 14 in accordance with the click operation of the inside direction key 15e. Then, the screen of the display unit 14 is returned instantaneously to the previous screen containing the displayed position preceding the cursor 11.

When the step S36 is completed, or when the determination result of step S35 is NO, the control is returned to the step S33.

As described in the foregoing, according to the portable electronic apparatus of the present invention, even when viewing and editing a large amount of data on the screen of the display unit, the user can operate the electronic apparatus easily by the single hand (the thumb), and the operability can be raised.

The present invention is not limited to the above-described embodiments, and variations and modifications may be made without departing from the scope of the present invention.

What is claimed is:

1. An electronic apparatus which includes a display unit, a key operation unit which detects depression operation of each of a first direction key and a second direction key adjacent to the first direction key and outputs a detection signal, and a control unit which controls displaying of a screen of the display unit in accordance with a detection signal from the key operation unit, the control unit comprising:

a cursor movement detection unit outputting a cursor movement information for moving the cursor on the screen of the display unit in accordance with a detection signal outputted when the first direction key is depressed solely; and a scrolling movement detection unit outputting a scrolling operation information for carrying out scrolling movement of the screen of the display unit in accordance with a detection signal outputted when both the first direction key and the second direction key are depressed simultaneously.

2. The electronic apparatus according to claim 1 wherein the control unit comprises a unit outputting a first scrolling operation information for carrying out scrolling movement of the screen of the display unit with the displayed position of the cursor being fixed.

3. The electronic apparatus according to claim 1 wherein the control unit comprises a unit outputting a second scrolling operation information for carrying out scrolling movement of the screen of the display unit containing the cursor.

4. The electronic apparatus according to claim 1 wherein the control unit comprises an application setting detection unit which outputs an application setting information for performing an application setting operation on the screen of the display unit, in accordance with a detection signal outputted when the second direction key is depressed solely.

5. The electronic apparatus according to claim 1 wherein the cursor movement information which is outputted by the cursor movement detection unit when the first direction key is clicked is a control information for returning the screen of the display unit to a previous screen containing a displayed position preceding the cursor.

6. A control method for an electronic apparatus which includes a display unit, a key operation unit which detects depression operation of each of a first direction key and a second direction key adjacent to the first direction key and outputs a detection signal, and a control unit which controls displaying of a screen of the display unit in accordance with a detection signal from the key operation unit, the control method comprising:

outputting a cursor movement information for moving the cursor on the screen of the display unit in accordance with a detection signal outputted when the first direction key is depressed solely; and outputting a scrolling operation information for carrying out scrolling movement of the screen of the display unit in accordance with a detection signal outputted when both the first direction key and the second direction key are depressed simultaneously.

7. The control method according to claim 6 further comprising outputting a first scrolling operation information for carrying out scrolling movement of the screen of the display unit with the displayed position of the cursor being fixed.

8. The control method according to claim 1 further comprising outputting a second scrolling operation information for carrying out scrolling movement of the screen of the display unit containing the cursor.

9. The control method according to claim 6 further comprising outputting an application setting information for performing an application setting operation on the screen of the display unit, in accordance with a detection signal outputted when the second direction key is depressed solely.

10. The control method according to claim 6 wherein the cursor movement information which is outputted when the first direction key is clicked is a control information for returning the screen of the display unit to a previous screen containing a displayed position preceding the cursor.

* * * * *